United States Patent [19]
Paternoster et al.

[11] Patent Number: 5,732,460
[45] Date of Patent: Mar. 31, 1998

[54] CORRUGATION MACHINE FOR MAKING A CORE FOR A HEAT EXCHANGER

[75] Inventors: Ronald Paternoster, Taylor; Carl Eckardt Schornhorst, Canton, both of Mich.; Kevin Bennett Wise; Gerald Joseph Selm, both of Connersville, Ind.

[73] Assignees: Livernois Research & Development Company; Ford Motor Company, both of Dearborn, Mich.

[21] Appl. No.: 649,800

[22] Filed: May 17, 1996

[51] Int. Cl.⁶ ................................................ B23P 15/26
[52] U.S. Cl. .................... 29/727; 29/33 G; 29/890.03
[58] Field of Search ................... 29/890.03, 890.039, 29/33 G, 726, 727, 33 T, 428

[56] References Cited

U.S. PATENT DOCUMENTS

| | | |
|---|---|---|
| 2,006,383 | 7/1935 | Boerger ........................ 29/33 G |
| 3,258,832 | 7/1966 | Gerstung . |
| 3,344,925 | 10/1967 | Graham . |
| 3,425,113 | 2/1969 | Ward, Jr. . |
| 3,762,031 | 10/1973 | Jonason et al. . |
| 4,175,309 | 11/1979 | Barnard .................... 29/890.039 |
| 4,274,482 | 6/1981 | Sonoda . |
| 4,434,643 | 3/1984 | Almqvist et al. . |
| 4,562,630 | 1/1986 | Larsson . |
| 4,679,410 | 7/1987 | Drayer . |
| 4,901,414 | 2/1990 | Breda et al. .................. 29/890.039 |
| 5,507,338 | 4/1996 | Schornhorst et al. ......... 29/890.039 |
| 5,603,159 | 2/1997 | Tsubakida et al. ............ 29/890.039 |
| 5,632,080 | 5/1997 | Harman et al. ................. 29/33 G |

FOREIGN PATENT DOCUMENTS

| | | |
|---|---|---|
| 62-203632 | 2/1986 | Japan . |
| 63-278621 | 8/1987 | Japan . |
| 61217697 | 12/1994 | Japan . |

*Primary Examiner*—Irene Cuda
*Attorney, Agent, or Firm*—Brooks & Kushman P.C.

[57] ABSTRACT

A machine for corrugating preformed plates that form the core element of a heat exchanger. A fold forming mechanism imparts an initial fold in the deformable links joining a series of preformed plates received from an external source. A gathering mechanism gathers the folded series of preformed plates to produce a flow of pairs of mating plates. Precut lengths of corrugated fins are then inserted between joined adjacent pairs of mating plates and a cut-off mechanism severs the deformable links of preselected pairs of links joining pairs of mating plates to separate individual core elements from the flow of plates.

20 Claims, 11 Drawing Sheets

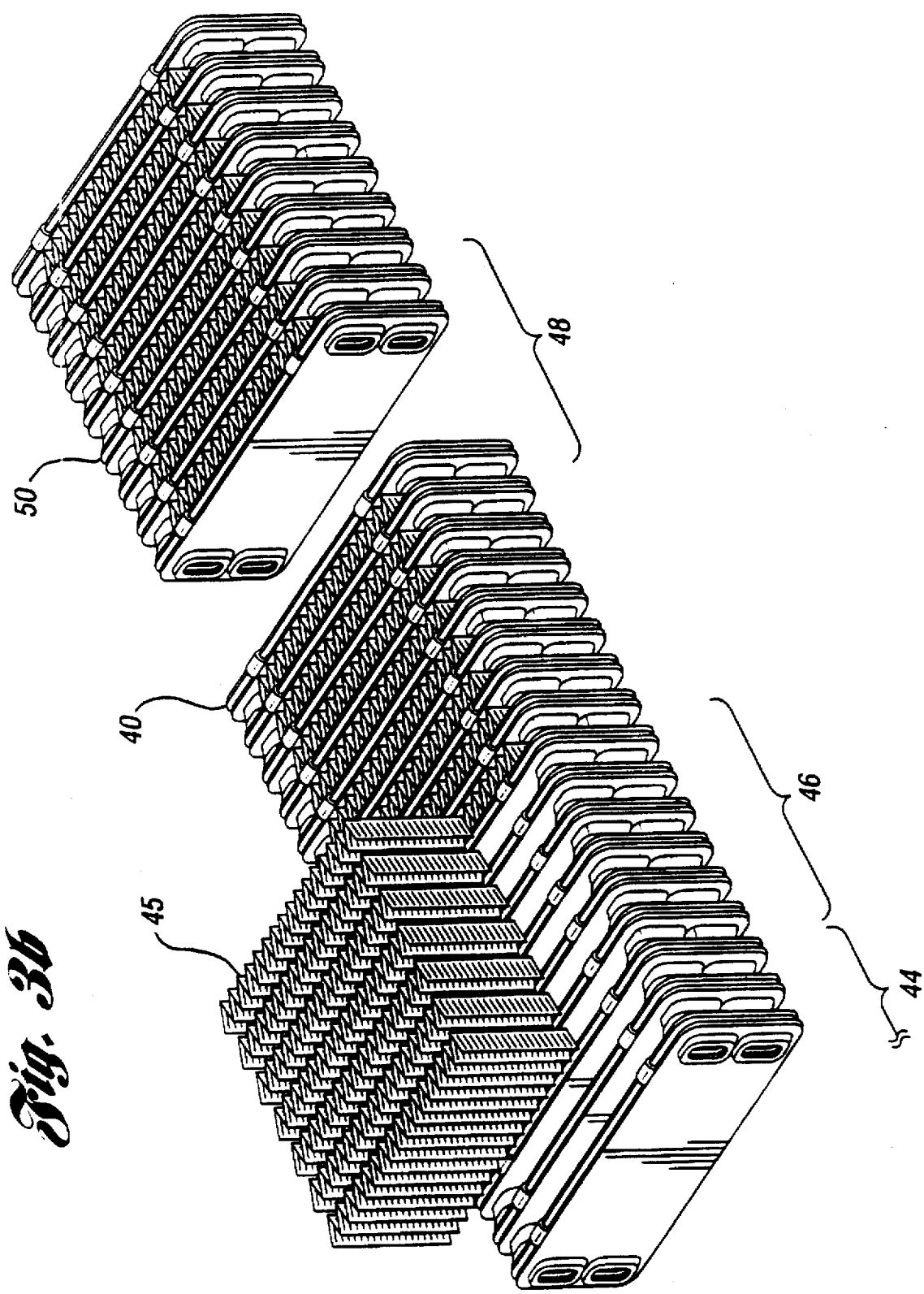

CORRUGATION MACHINE FOR MAKING A CORE FOR A HEAT EXCHANGER

TECHNICAL FIELD

The invention is related to the field of folded plate heat exchangers and, in particular, to a machine for making the core element of a folded plate heat exchanger.

BACKGROUND ART

Folded or corrugated plate heat exchangers are well known in the art. In these types of heat exchangers, elongated plates are joined together to define a plurality of fluid passageways therethrough. Each of the passageways is formed between the inwardly facing surfaces of a joined pair of mating plates. The interiors of these joined mating plates define fluid passageways through which a refrigerant, a fluid or a gas to be cooled may flow. It is also known in the art to insert conductive fins between adjacent pairs of mating plates to enhance the heat exchange between the fluid flowing through the internal passageways and a fluid, such as air flowing between the adjacent pairs of mating plates. Heat exchangers of this type have particular utility as evaporators for air conditioning systems, oil coolers, condensers, radiators, and the like.

Typically, folded plate heat exchangers are manufactured by stacking individual plates together to form a plurality of adjacent pairs, then interleaving the pairs of mating plates with conductive fins to form a stacked plate structure. End plates are then placed at opposite ends of the stacked plate structure to form a heat exchanger core. The assembled heat exchanger core is then brazed in a furnace to complete the manufacturing process.

Assembly of a heat exchanger core in this manner is a labor-intensive process requiring human assemblers to physically stack the individual plates with each other to form the heat exchanger core prior to being brazed.

Methods which increase productivity in fabricating corrugated plate heat exchangers are disclosed in U.S. Pat. Nos. 3,258,832 and 3,344,925, which are incorporated herein by reference. These patents disclose a method of making heat exchanger cores in which a plurality of individual plates are stamped from a single strip and interlinked to each other. The interlinked plates are then folded in a zig-zag (W type) configuration to form the desired stacked plate structure.

DISCLOSURE OF THE INVENTION

The invention is directed to a machine for continuously stacking a strip of preformed plates to generate a connected string of mating plates, for inserting the conductive fins between adjacent pairs of mating plates, and for severing the connecting links to separate a desired number of plates from the connected string of plates.

An object of the present invention is to provide a machine for continuously corrugating preformed plates to make a heat exchanger core assembly.

Another object of the invention is the use of a tractor drive bending or folding mechanism for initiating the folding of preformed plates in a heat exchanger so that adjacent plates are properly aligned.

Still another object of the invention is a stuffing mechanism to insert corrugated fins between adjacent pairs of mating plates.

Yet another object of the invention is a cut-off mechanism for separating a predetermined number of joined plates from the continuous flow of folded and stuffed plates.

The machine, according to the invention, consists of a base having a crimp forming mechanism mounted thereon for continuously crimping the deformable links of a continuous strip of preformed plates to form a continuous flow of partially crimped joined plates. A feed mechanism attached to the base feeds a strip of preformed plates to the crimp forming mechanism at a predetermined speed. A gathering mechanism disposed downstream of the crimp forming mechanism completes the crimping of the deformable links to form a continuous flow of serially connected pairs of mating plates. A stuffing mechanism disposed along the path of the gathering mechanism inserts precut lengths of corrugated fins between adjacent pairs of mating plates. Finally, a cut-off mechanism downstream of the stuffing mechanism severs the deformable links connecting a preselected pair of mating plates to form a heat exchanger core element.

These and other objects of the invention will become more apparent from a reading of the specification in conjunction with the drawings.

BRIEF DESCRIPTION OF THE DRAWINGS

FIGS. 3A and 3B show the changes in the configuration of the strip of preformed plates as it passes through the machine according to the invention;

BEST MODE FOR CARRYING OUT THE INVENTION

Figure 1:
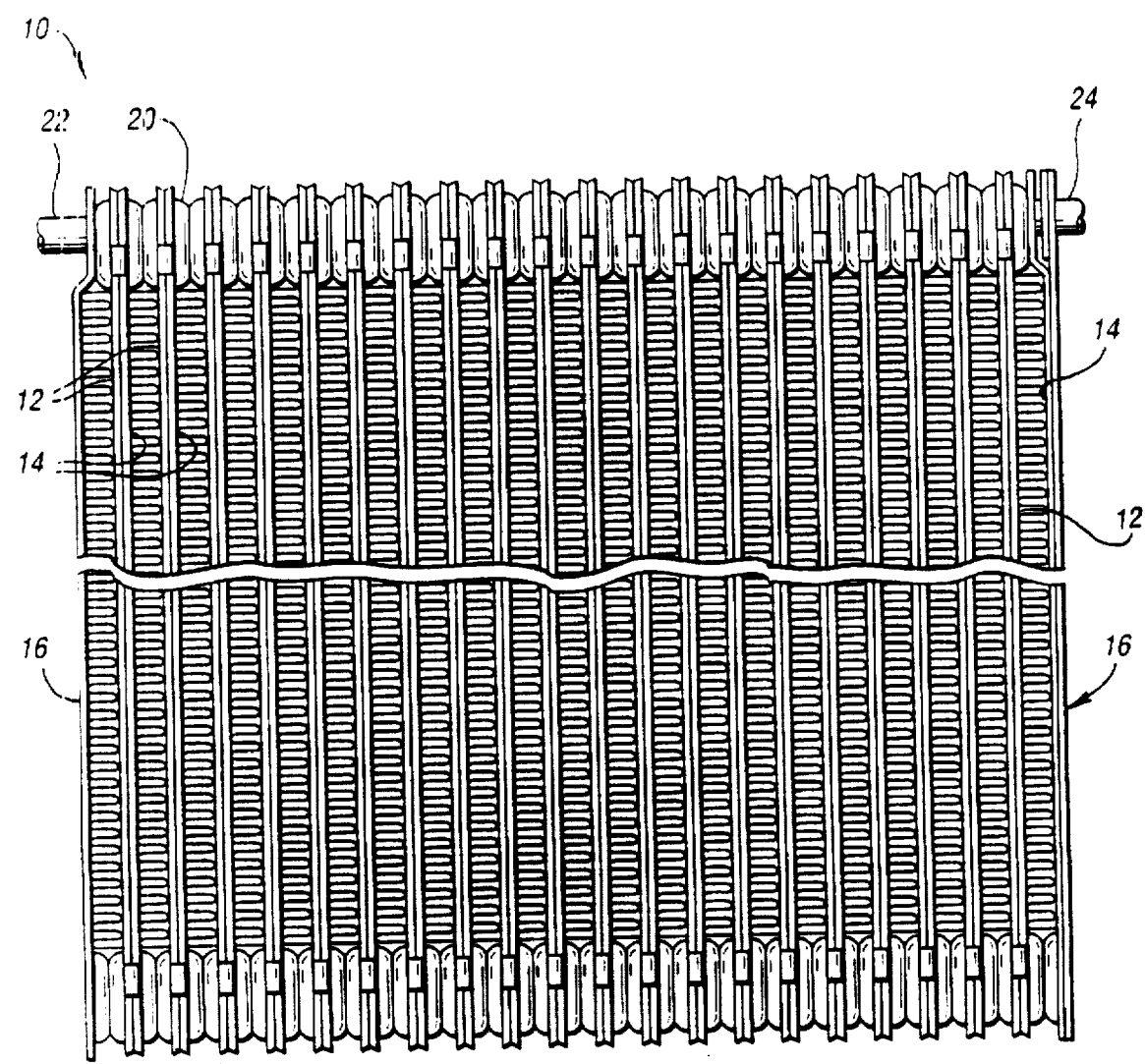
FIG. 1 is a front view of a heat exchanger.

The invention is related to a corrugation forming machine for making folded plate heat exchangers of the type shown in FIG. 1. The heat exchanger 10 includes an inlet port 22 and an outlet port 24 formed within a header 20 at either one end or both ends of the heat exchanger. The headers 20 are in direct fluid communication between joined plates such as those depicted by the reference numerals 12 and 14, as will be discussed hereinafter. The plates 12 and 14, as shown in FIG. 2, are complements of each other and the headers 20 have aligned apertures 16 providing fluid communication between headers 20.

The apertures 16 may be formed at either one or both ends of the plates 12 and 14, and likewise the inlet and outlet ports can be located at one end of the heat exchanger or at opposite ends as shown. In the embodiment shown in FIG. 1, refrigerant or any other fluid to be cooled is directed into the inlet port 22, then passes through tortuous fluid passageways formed between the joined mating plates 12 and 14 then exits through the outlet ports 24.

Figure 2:
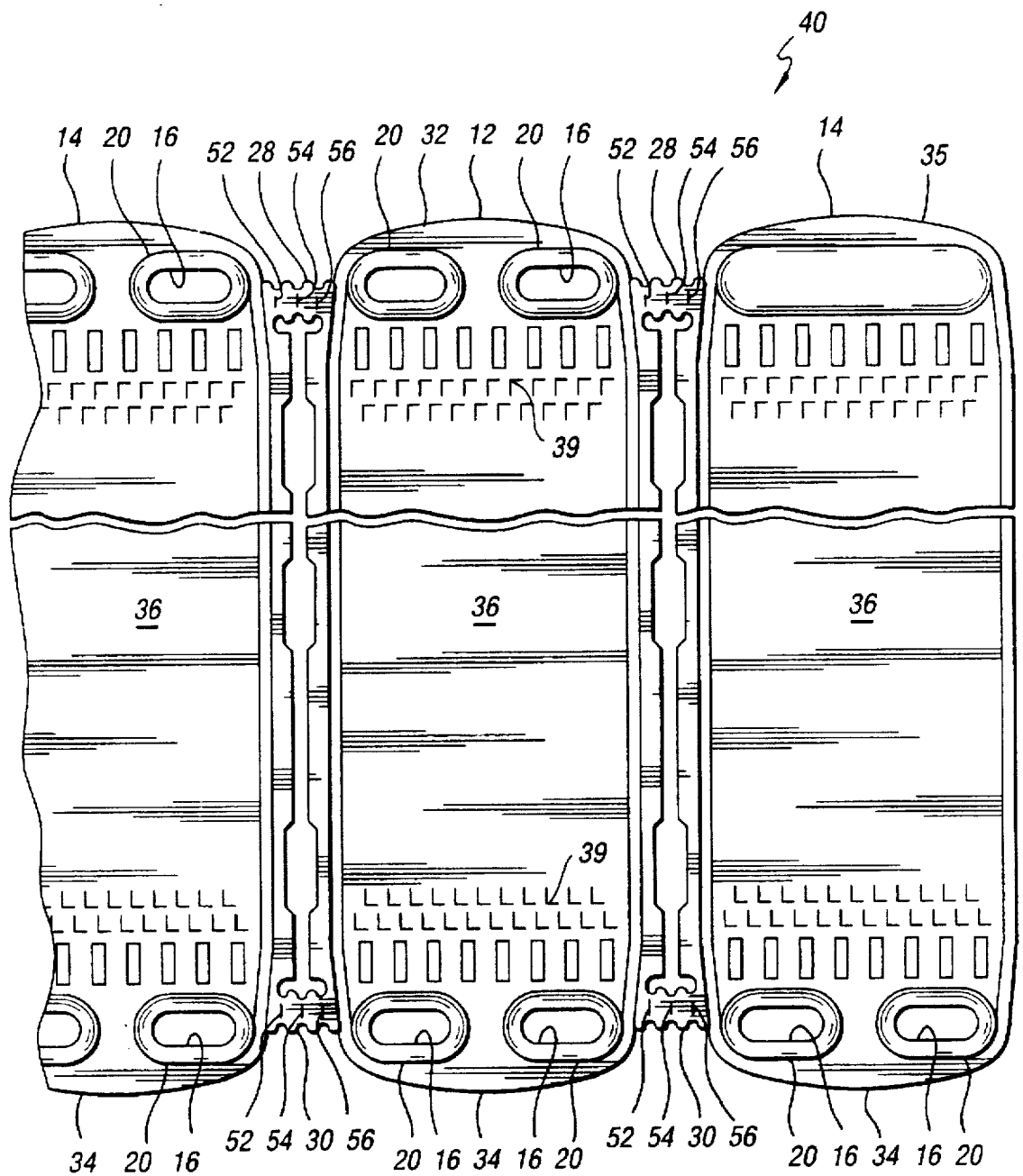
FIG. 2 is a top view showing a portion of the strip of preformed plates.

The mating plates 12 and 14 are alternately formed from a continuous sheet of material 40 as shown in FIG. 2 and are interconnected to each other by deformable links 28 and 30. The sheet 40 may be an aluminum sheet coated with an aluminum brazing alloy or any other suitable material. The sheet 40 is preferably a continuous strip of material in which the individual plates 12 and 14 are alternately stamped in a die controlled by a PLC/PLS or other computerized means known in the stamping art.

Plates 12 and 14 each include a pair of end portions 32 and 34 and an intermediate portion 36. Each of the intermediate portions 36 includes a plurality of beads or guides 39 to provide a tortuous path to the fluid passing between joined plates 12 and 14 from one end to the other.

The deformable links 28 and 30 are indented at predetermined location to form a series of preferential bend zones indicated by dashed lines 52, 54 and 56. The bend zone indicated by dashed line 54 is the preferred bending zone when adjacent pairs of mating plates are to be folded face-to-face. The bend zones indicated by dashed lines 52 and 56 are the preferred locations at which the links 28 and 30 are to be bent between pairs of mating plates 12 and 14. The distance between the bend zones 52 and 56 is preferably the same distance as the thickness of the corrugated webbing to be inserted between the pairs of mating plates as shall be explained hereinafter.

In some embodiments of the heat exchanger 10, the end portions 32 or 34 of selected plates 12 and 14 may include end portions in which the apertures 16 are omitted such as end portion 35 shown in FIG. 2. The plates 12 and 14, in which these apertures are omitted, form baffles which cause the fluid or refrigerant to follow a serpentine path through the heat exchanger.

Figure 3A:
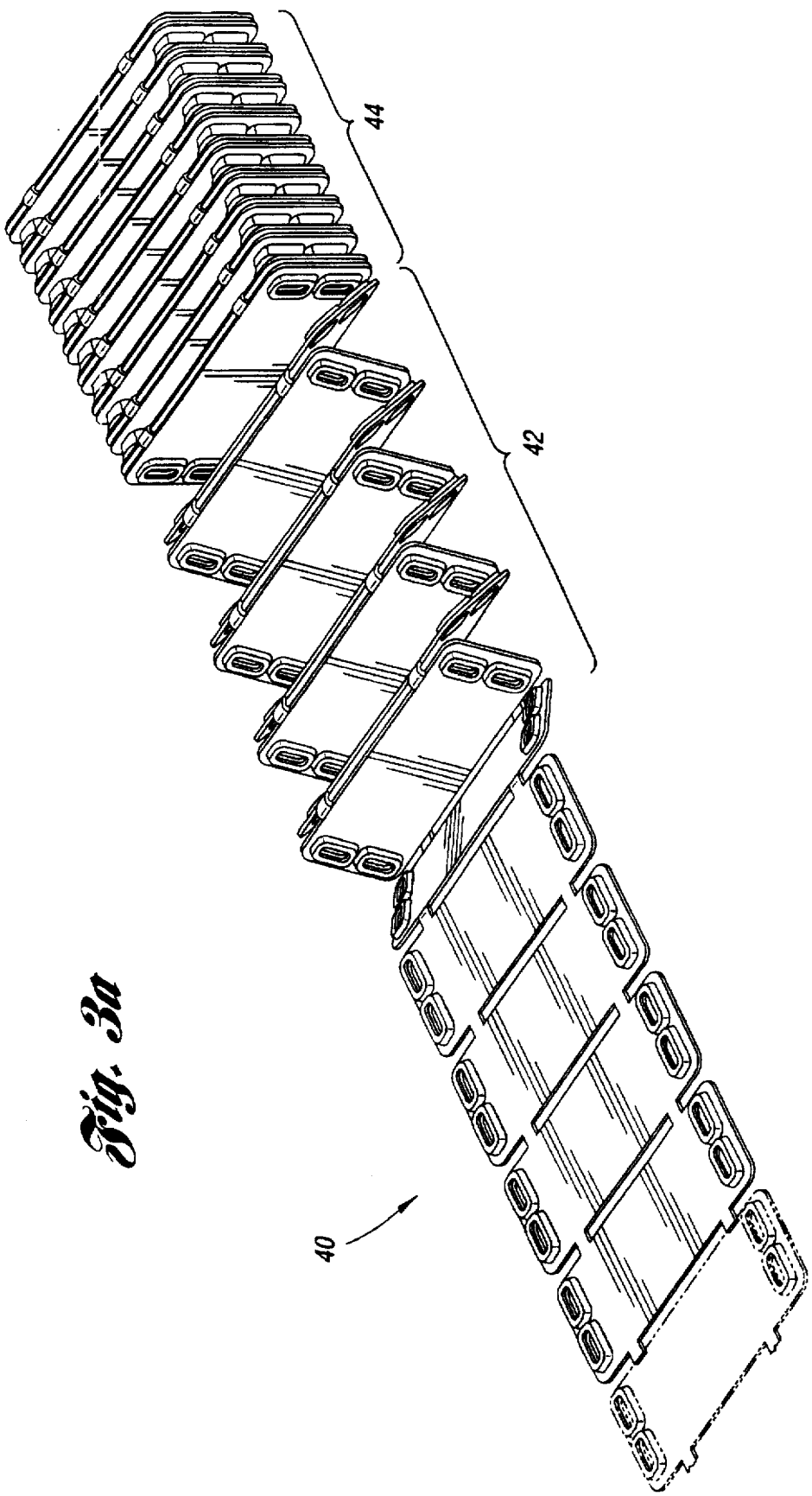

The formation of the core element of the heat exchanger 10 by the plate corrugation machine according to the invention is shown in FIGS. 3A and 3B. Referring first to FIG. 3A, the deformable links 28 and 30 of the continuous strip 40 of alternating plates 12 and 14 are initially folded in a folding area 42 by a fold forming mechanism of the machine to impart to the continuous strip 40 an initial corrugation, as illustrated. The initially corrugated strip 40 is then gathered in a gathering area 44 by the gathering mechanism in which the folding of the deformable links is substantially completed. Then, as shown in FIG. 3B, precut lengths of corrugated fins or webbing 45 are inserted between adjacent sets of mating plates 12 and 14 in a stuffing area 46 by a web stuffing mechanism.

Finally, the folded deformable links 28 and 30 separating a desired number of plates 12 and 14 from the continuous strip 40 are cut off in a cutting area thereby severing a desired core element 50 of a heat exchanger from the continuous strip 40. The desired core element of the heat exchanger is then removed from the machine and placed in a furnace to fuse or braze the adjacent plates and intervening webbing to each other.

A side view of the corrugation machine 100 for forming the core element of the heat exchanger, as described above, is shown in FIG. 4. FIG. 5 is a corresponding plan view of the machine 100. The corrugation machine 100 has a base 102 including a feed mechanism 104 provided at one end for feeding the strip 40 containing preformed plates 12 and 14 to a material guide 106 which longitudinally aligns the strip 40 in the machine.

Figure 6:
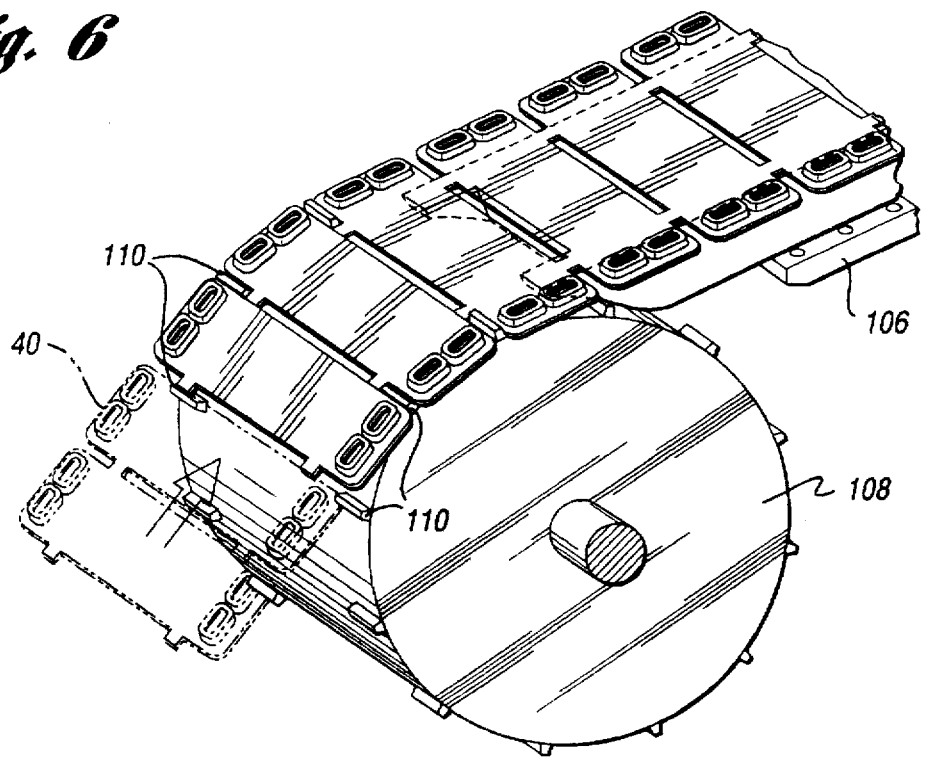
FIG. 6 is a perspective view of the feed mechanism.

As shown in FIG. 6, the feed mechanism 104 consists of a feed drum 108 having peripheral cogs 110 which are received in the space between the plates 12 and 14. The rotational speed of the feed drum 108 controls the rate at which the strip 40 is transported along the material guide 106. The machine may include a process control monitor 180 intermediate the feed mechanism 104 and a fold forming mechanism 112. The process control monitor 180 may be an optical or mechanical device adapted to detect predetermined plates such as the end plates of a core element and to count the number of plates between the predetermined plates to assure that each core 50 severed from the continuous strip of preformed plates 40 will have the proper number of preformed plates. Preferably, the process control monitor 180 will also be able to detect a misalignment of the continuous strip 40 with the bend forming mechanism 112 or detect a defect in one or more of the plates 12 and 14.

Figure 7:
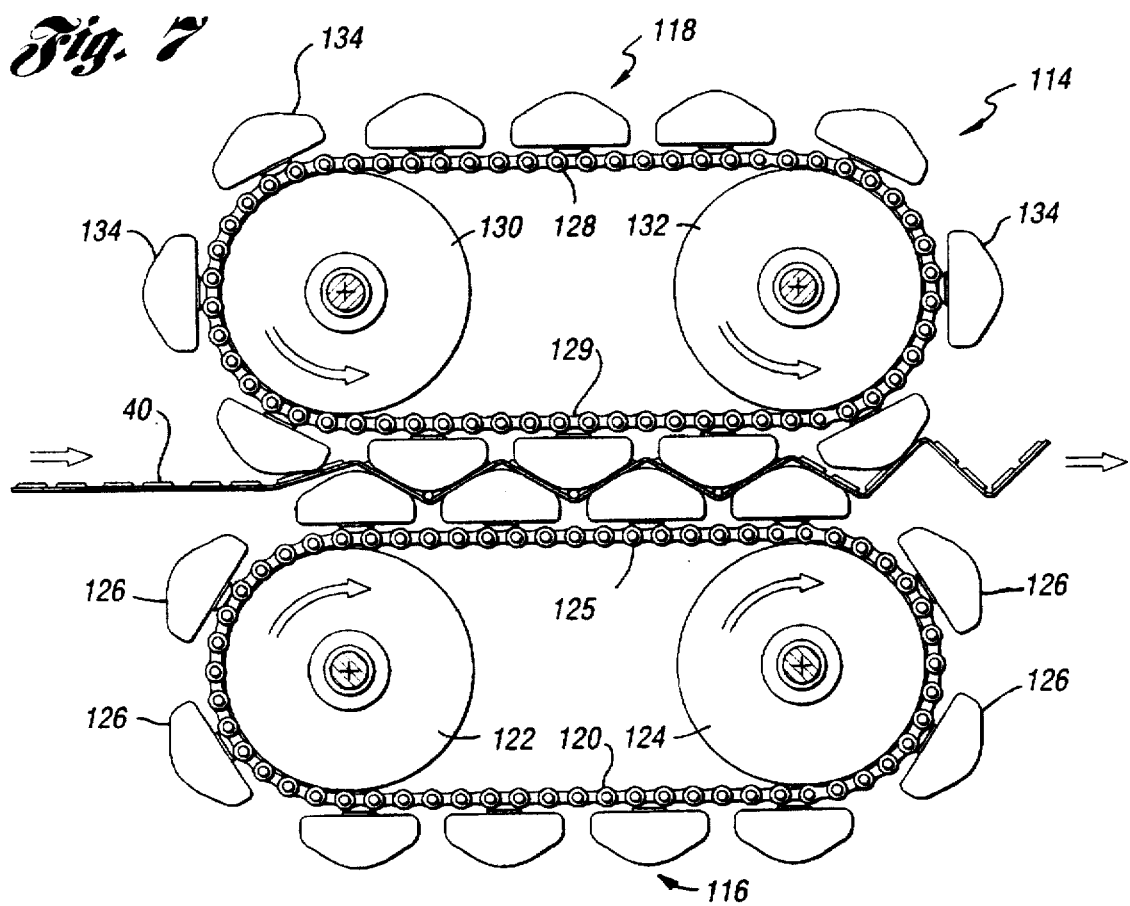
FIG. 7 is a side view of the crimping mechanism.

The fold forming mechanism 112 consists of two pairs of opposing tractor or caterpillar drives 114 disposed on the opposite sides of the plates 12 and One pair of opposing tractor drives is shown in FIG. 7. Each tractor drive 114 has a lower drive unit 116 and an interlinked substantially parallel upper drive unit 118 that normally drives or is driven in synchronization with the lower drive unit by means of gears or other accurate drive mechanisms. Selective alignment of the lugs 126 in relation to lugs 134 is accomplished by interlinked means for phasing the lugs 126 and 134 relative to each other, such as a suitable gearing system or phasing gear. The lower drive unit 116 has a chain belt 120 supported between two longitudinally separated wheels 122 and 124 and has a linear section 122 therebetween substantially parallel to the direction of flow of the strip 40. One of the wheels 122 and 124 is a drive wheel driven by an electric motor and the other wheel is an idler wheel.

A plurality of equally spaced lower lugs 126 are attached to the chain belt 120 and engage in an alternating manner the lower surfaces of the plates 12 and 14. The upper drive unit 118 has a corresponding chain belt 128 supported between longitudinally separated wheels 130 and 132. The chain belt 128 also has a linear portion 129 substantially parallel to the linear portion 125 of chain belt 120. Chain belt 128 has a like plurality of equally spaced lugs 134 attached thereto engaging the upper surfaces of plates 12 and 14 as shown. The lugs 126 and 134 are generally triangularly shaped and interleaved with each other such that their opposing faces support adjacent plates 12 and 14 in a "W" form as depicted in FIG. 3A and initially folding the links 28 and 30.

The apexes of the lugs 126 and 134 are rounded as shown. However, the apexes of the lugs 126 are preferentially rounded off to a greater extent than the apexes of lugs 134 to accommodate the different transition points between the crimp forming area and the gathering area of the machine.

The rotational speed of the feed drum 108 and the tractor drives 114 are synchronized to provide for the velocity transition of the strip 40 as the plates 12 and 14 are initially folded relative to each other.

Figure 8:
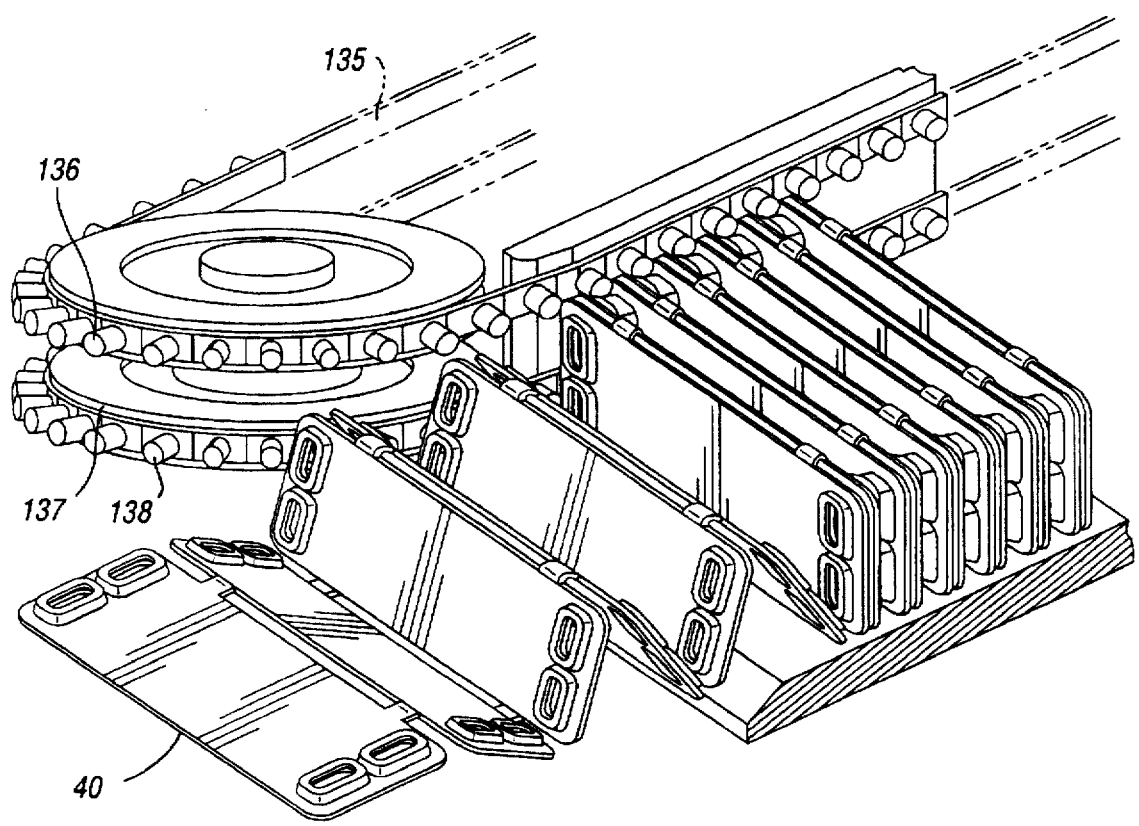
FIG. 8 is a partial perspective of the gathering mechanism.
Figure 9:
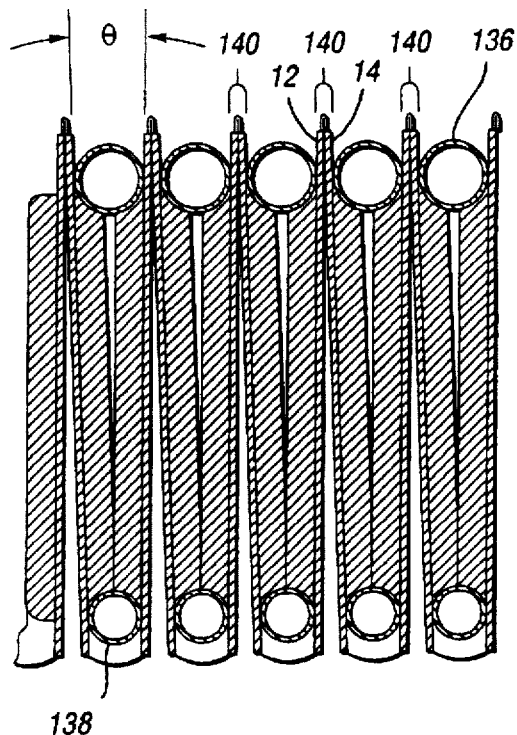
FIG. 9 is a cross-section of the folded plates showing the locations of the upper and lower fingers.

The gathering of the folded plates 12 and 14 after they exit the fold forming mechanism is accomplished by a pair of gathering belts 182 and 184 as shown in FIG. 5. The gathering belts 182 and 184, as shown in FIG. 8, each have an upper belt 135 and a lower belt 137. The upper belt 135 has a plurality of equally spaced upper spacers 136 and the lower belt 137 has a like plurality of equally spaced lower spacers 138. The lower spacers 138, as shown in FIG. 9, are received between each set of mating plates 140. Each set of mating plates consists of face-to-face plates 12 and 14 and the lower spacers 138 control the degree of folding of the deformable links 28 and 30 between adjacent sets of mating plates 12 and 14, collectively identified by the reference numeral 140 about the bend zones 52 and 56. The upper spacers 136 are also received between adjacent sets of mating plates 140 and control the bending of the deformable links 28 and 30 extending between the individual plates 12 and 14 of the set of mating plates 140. This bending of the deformable links 28 and 30 between upper spacers 136 is about the bend zone 54. Although in the preferred embodiment, the gathering belts 182 and 184 consist of two belts 135 and 137, it is recognized that each of the gathering belts 182 and 184 may be a single belt on which the upper and lower spacers 136 and 138 are attached.

In the preferred embodiment, as shown in FIG. 9, the diameter of the upper spacers 136 is selected such that spacing between adjacent sets of mating plates 140 is disposed at a preselected pitch (angle θ shown in FIG. 9) relative to each other to facilitate the stuffing of the corrugated webbing 45 in the space therebetween. Although the spacers 136 and 138, as shown in FIGS. 8 and 9, have a circular cross-section, it is recognized that they may have a square, rectangular or any other suitable shape.

Figure 10:
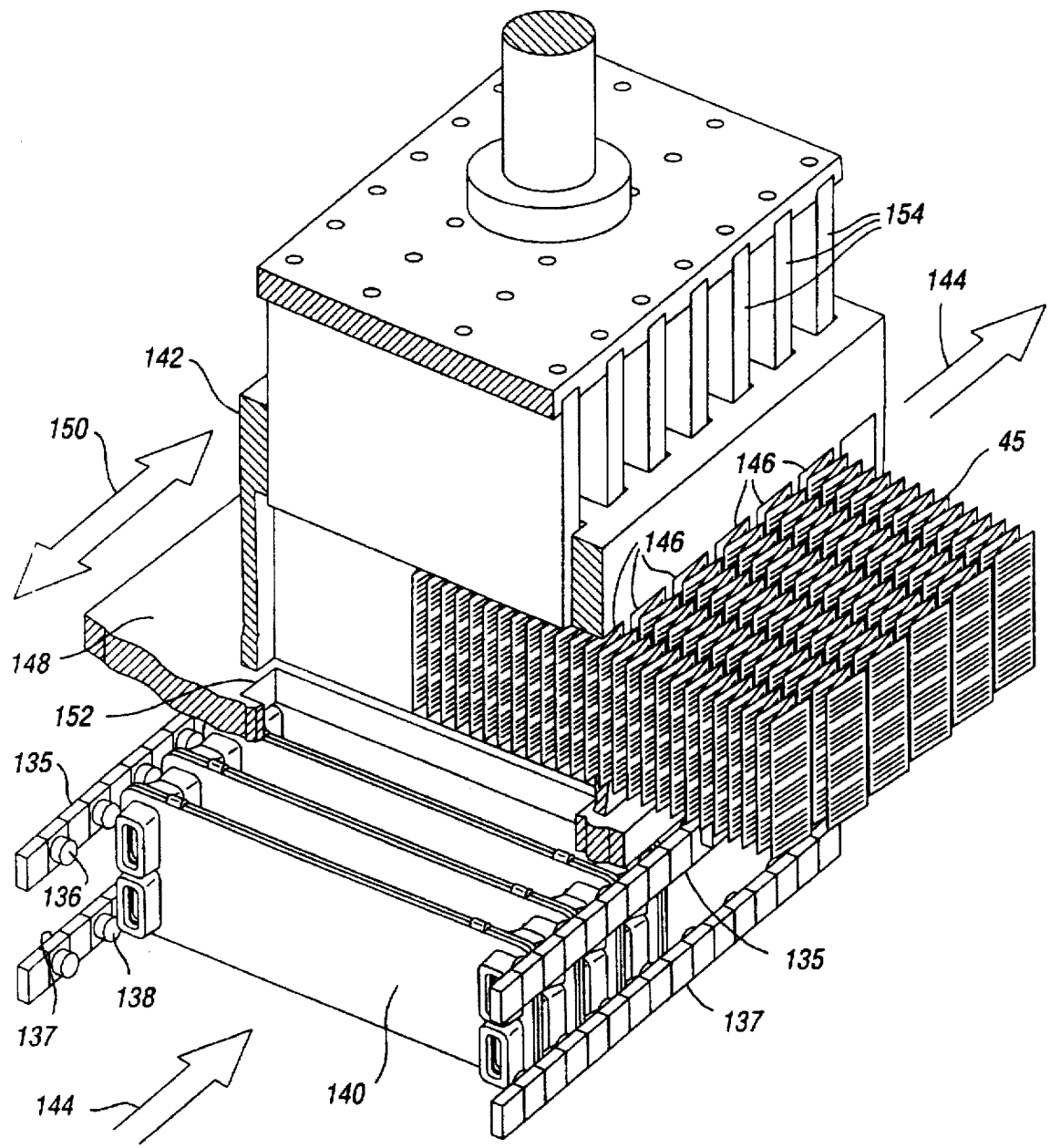
FIG. 10 is a perspective view of the stuffing mechanism.

The stuffing of the corrugated webbing 45 between adjacent sets of mating plates 140 is performed by the stuffing box 142 located downstream along the gathering belts 182 and 184. The stuffing box 142, as shown in FIG. 10, is located above the joined sets of mating plates as they are transported by the gathering belts 182 and 184 in the direction indicated by arrows 144. The stuffing box 142 has a plurality of web cavities 146 into which precut lengths of corrugated webbing 45 are received. The precut lengths of corrugated webbing are pre-loaded in a tray (not shown) and are swept (transported) from the tray into the web cavities 146. A trap door 148 is provided at the bottom of the stuffing box 142 and is movable in a longitudinal direction indicated by arrow 150 between an open and closed position. In its closed position, the trap door 148 temporarily holds the precut lengths of webbing 45 until a required number of sets of mating plates 140 equal to the number of precut webbing segments are transported under the stuffing box 142. The trap door 148 has a plurality of slots 152 which, when aligned with the web cavities 146, permit the precut lengths of corrugated webbing 45 to be inserted into space between the adjacent sets of mating plates. The insertion of the precut lengths of corrugated webbing 45 into the space between the adjacent sets of mating plates 140 may be performed manually, or by a set of pneumatically-actuated stuffing blades 154, one of which is associated with each web cavity 146.

Figure 4:
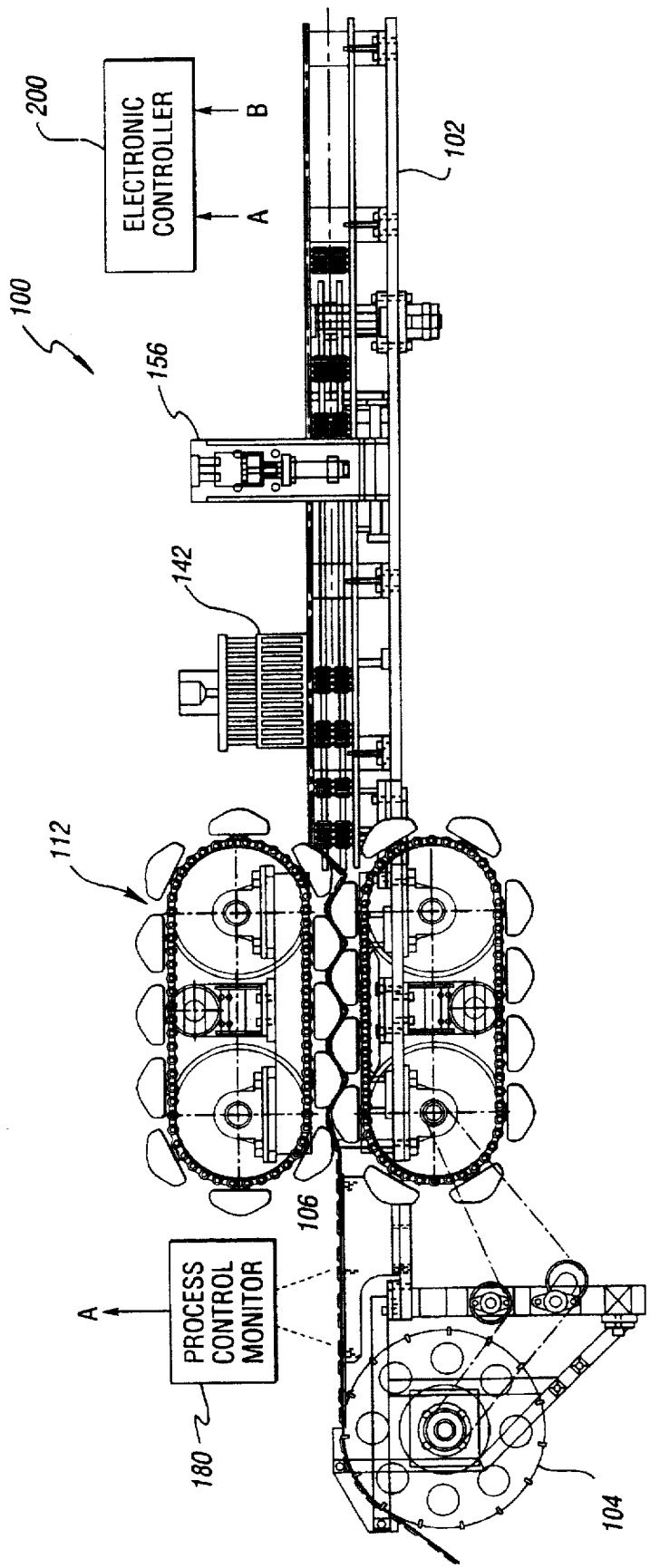
FIG. 4 is a side view of the machine.
Figure 5:
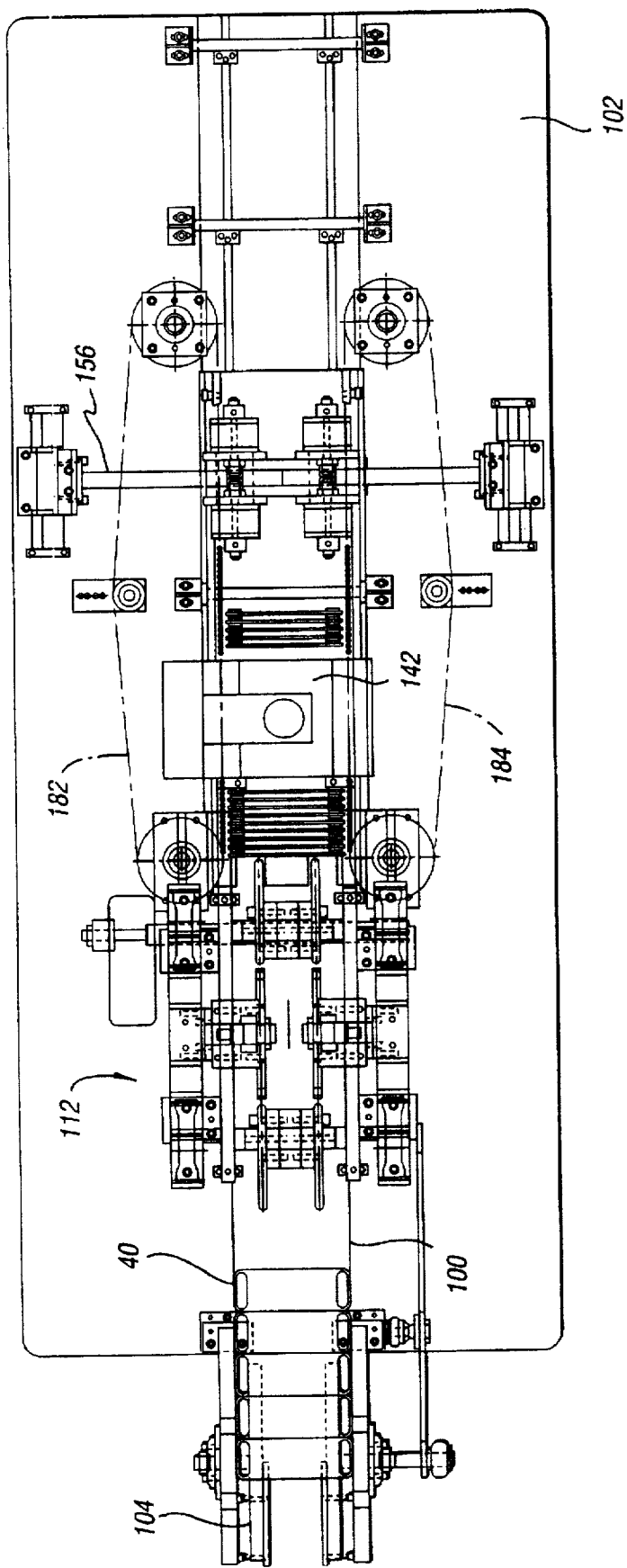
FIG. 5 is a top view of the machine.

In operation, when the desired number of sets of mating plates 140 are located under the stuffing box 142, as determined by the electronic controller 200 shown in FIG. 4, the gathering belts 182 and 184 are stopped. The stopping of the gathering belts 182 and 184 is synchronized such that the spaces between the adjacent sets of mating plates are vertically aligned with the web cavities 146. The electronic controller 200 counts the number of pairs of mating plates, for example, by monitoring the number of revolutions of the motor driving the gathering belts 182 and 184. In the preferred embodiment, suitable gearing is selected so that one revolution of the motor is equivalent to counting one pair of mating plates. The trap door 148 is then opened and the stuffing blades 154 area actuated to displace the precut lengths of corrugated webbing 45 from the web cavities 146 into the spaces between the adjacent sets of mating plates 140.

After the lengths of corrugated webbing 45 are inserted into the spacings, the stuffing blades 154 are withdrawn from the web cavities 146. The gathering belts 182 and 184 are restarted. The trap door 148 is then closed and a new set of lengths of the corrugated webbing are inserted into the web cavities 146. The sets of mating plates 140 with the inserted corrugated webbing 45 are then transported from under the stuffing box 142 and replaced by new sets of mating plates 140 by the gathering belts.

As previously discussed, the diameter of the upper spacers 136 of the gathering belts 182 and 184 is selected to provide a proper pitch between adjacent sets of mating plates 140. This facilitates the insertion of the precut lengths of corrugated webbing 45 and allows for limited misalignment between the web cavities 146 of the stuffing box 142 and the spaces between the adjacent sets of mating plates 140.

Figure 11:
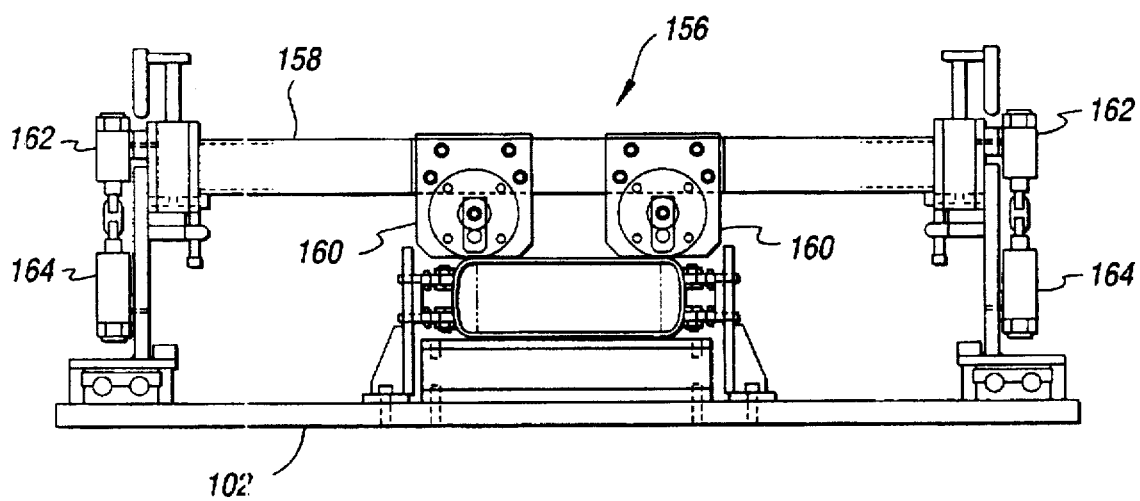
FIG. 11 is a front view of the cut-off mechanism.

A tab cut-off mechanism 156, shown in FIG. 11, is located along the gathering belts 182 and 184 downstream of the stuffing box 142. The tab cut-off mechanism 156 is attached to the base 102 and has a bridge 158 extending over the corrugated and stuffed plates. A pair of pneumatically actuated cutters 160 are suspended from the bridge 158 and a pair of pneumatic cylinders 162 and 164 are operable to raise and lower the bridge 158 and the cutters 160. In the lowered position of the bridge 158, the cutters are operable to engage and cut-off a portion of the deformable links 28 and 30, of a preselected pair of mating plates 140 connecting plates 12 and 14 to each other.

Figure 12:
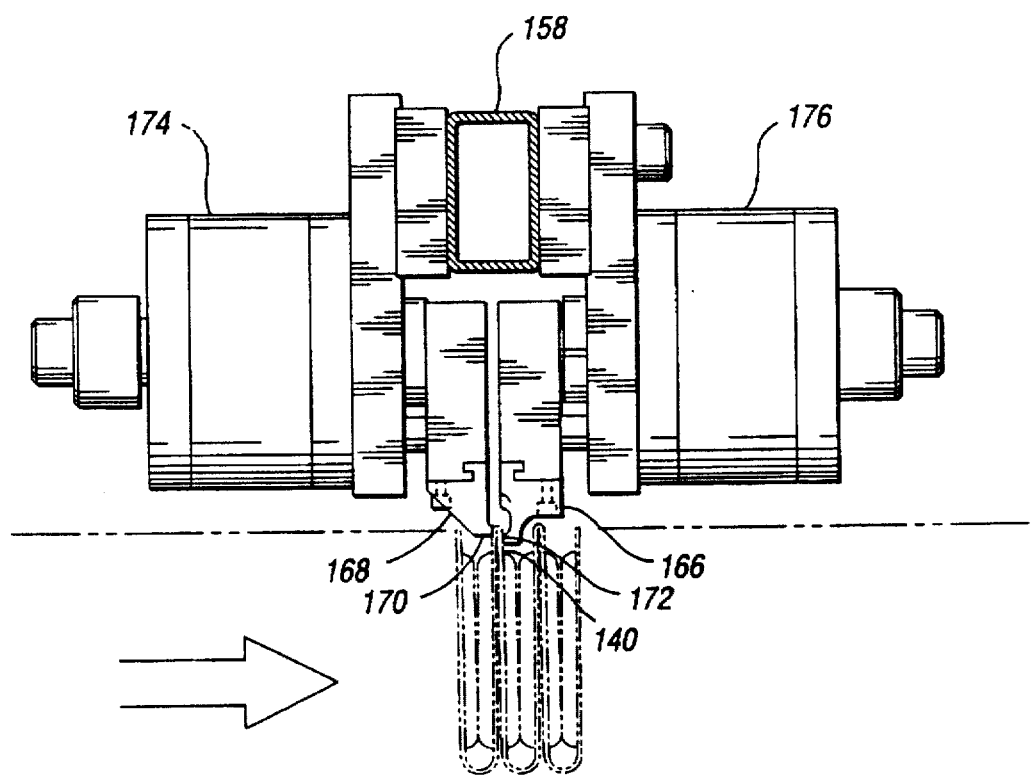
FIG. 12 is a side view of the cutters.
Figure 13:
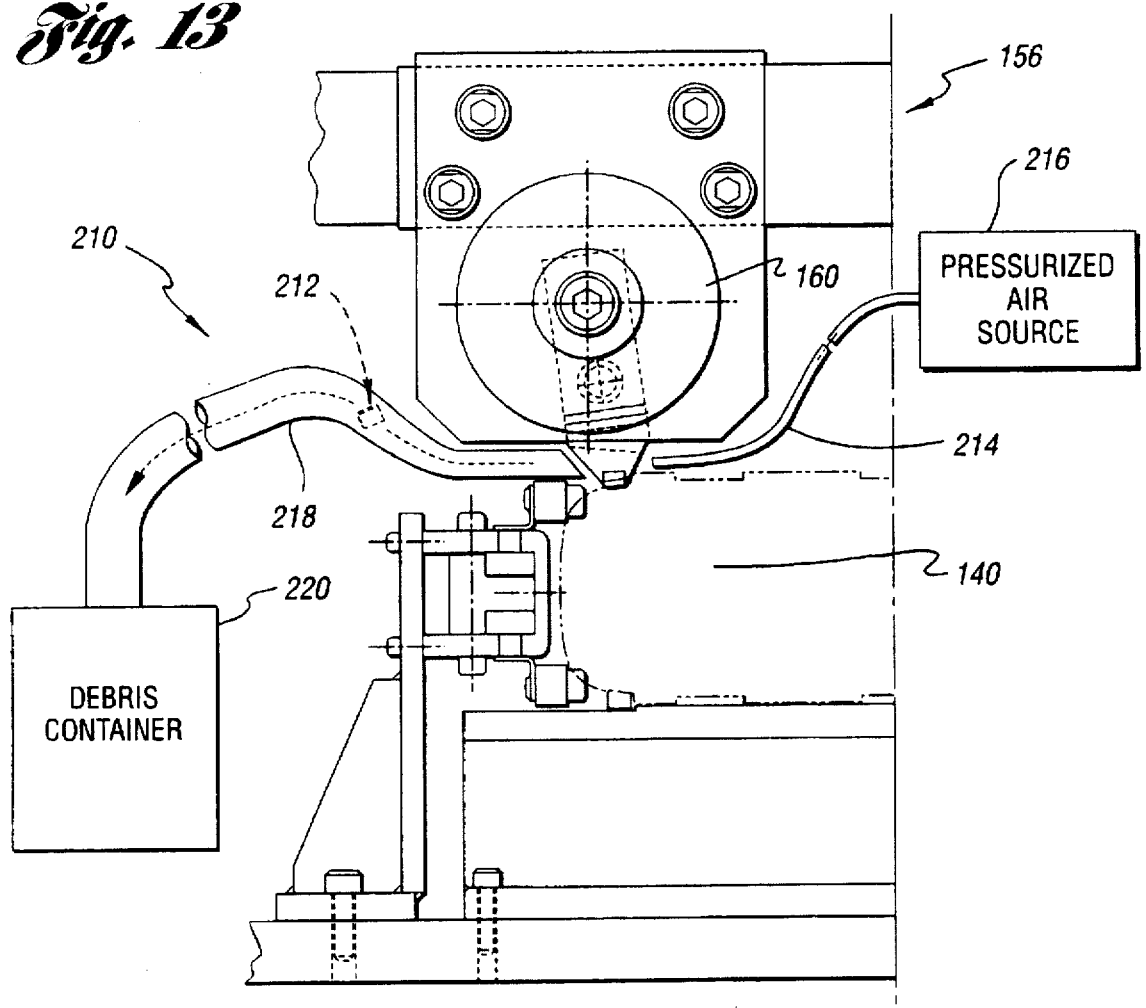
FIG. 13 is a front view of a cutting debris removal mechanism.

The details of the cutters 160 are shown in FIG. 12. The cutters 160 have a pair of pneumatic cylinders 174 and 176 attached to the bridge 158. Pneumatic cylinder 176 actuates a back-up head 166 to engage the side of the links 28 and 30 facing downstream from the stuffing box 142 as shown. After the links are engaged by the back-up head 166, pneumatic cylinder 174 advances a shearing head 168 to sever the linkage between the lower edge 170 of the shearing head 168 and the upper edge 172 of the back-up head 166. In the preferred embodiment, the back-up head 166 is moved approximately 0.125 inches by pneumatic cylinder 176 and shearing head 168 is moved approximately 0.200 by pneumatic cylinder 174 to shear the linkage.

A cutting debris removal mechanism 210 is provided at tab cut-off mechanism 156 to remove slug 212 resulting from the severing of the links 28 and 30 between face-to-face plates 12 and 14. The debris removal mechanism 210 has a source conduit 214 connected to a pressurized source of air 216 and a removal conduit 218 which guides to severed slug 212 and other debris to a retainer 220. The air flow from the source conduit 214 to the removal conduit 218 is sufficient to carry the severed slug into the removal conduit. Preferably, the air flow between the source conduit 214 and the removal conduit 218 is applied only during the activation of the tab cut-off mechanism 156.

The cut-off of the deformable links 28 and 30 separates the desired number of plates 12 and 14 from the continuous stream plates exiting the stuffing area to form an individual heat exchanger core element 50. The cutting cuts the links 28 and 30 between mating plates 12 and 14 of a predetermined set of mating plates 140.

Preferably, the stuffing box 142 stuffs, at one time, the corrugated webbing 45 between the number of sets of mating plates 140 required to produce the heat exchanger core element 50. This permits the cutting of the deformable links to take place downstream of the stuffing box 142 while the gathering belts 182 and 184 are stopped for the stuffing operation. In operation, when the gathering belts 182 and 184 are stopped, the pneumatic cylinders 162 and 164 are activated to lower the bridge 158 to the desired position above the stream of corrugated plates and the cutters 160 are actuated to sever the links 28 and 30. After the links 28 and 30 are cut, the separated core element 50 of the heat exchanger is removed from the machine and prepared with the required fittings. The core element 50 is then bonded, welded, or brazed to bond the individual plates 12 and 14 of each set of mating plates to each other to bond each set of mating plates to the adjacent set of mating plates and to bond the corrugated webbing to the adjacent sets of mating plates. The bonded sets of mating plates may then be cleaned as desired. The bonding seals the plates 12 and 14 of each set of mating plates to each other and adjacent sets of mating plates to form a fluid-tight seal therebetween.

The operation of the plate corrugation machine, the feed mechanism, crimping mechanism, gathering mechanism, and the cut-off mechanism, stuffing of corrugated wedding, are controlled by electronic controller 200 shown in FIG. 4. The electronic controller may be programmed to control the feed rate of the strip 40 of preformed plates, into the machine as well as the stopping of the gathering belt and the number of plates to be included in each core element. This permits the machine to be programmed by the operator to produce various types of heat exchanger core elements without mechanical alterations or modifications of the machine itself.

Figure 14:
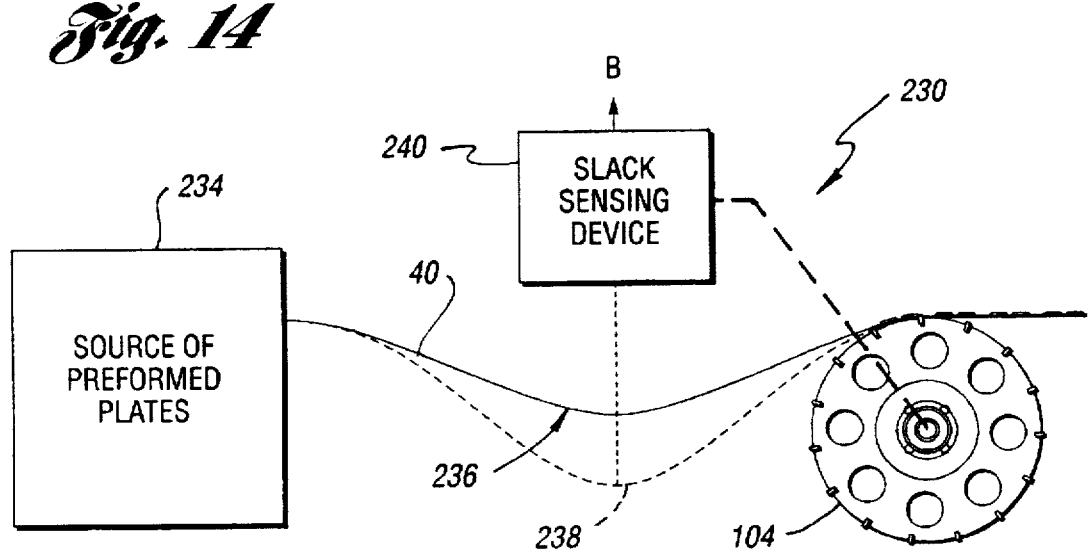
FIG. 14 is a side view of the accumulation station.

In a preferred embodiment, an accumulation station 230, such as a humping or queuing mechanism is located between the feed mechanism 104 of the corrugation machine 100 and a source 234 of the strip of preformed plates 40 as shown in FIG. 14. As previously indicated, the source 234 of preformed plates may be a stamping press, a die or a roll of preformed plates. The accumulation station 230 accommodates the discontinuity in material flow through the corrugation machine 100. As previously discussed, the corrugation machine 100 is periodically stopped to execute the stuffing of the precut lengths of webbing 45 between adjacent pairs of mating plates 140 and the severing of the deformable links 28 and 30 by the cut-off mechanism 156. Additionally, a stoppage may occur in source 234 for material changeovers. In the accumulation station 230, the strip of preformed plates 40 may change from a minimal slack position indicated by solid curve 236 to a maximum slack position, indicated by dashed curve 238.

The accumulator station shown in FIG. 14 may include a slack sensing device 240. The slack sensing device 240 detects the amount of and the flow rate of the strip of preformed plates 40 from the source 234. When the slack in the strip of preformed plates between the source 234 and the feed mechanism 104 in the accumulator station exceeds a predetermined slack, the slack sensing device 240, by electronic feedback to the control 200, or by suitable linkage to the feed mechanism 104, indicated by a dashed line, increases the rate at which the feed mechanism feeds the strip of preformed plates 40 to the fold forming mechanism 112 so that the amount of preformed plates in the accumulator station 230 is maintained within the minimal slack position 236 and the maximum slack position 238. Because the speed of the feed mechanism 104, the fold forming mechanism 112 and the gathering belts 182 and 184 are synchronized with each, the increasing or decreasing of the speed of the feed mechanism 104 also increases or decreases the speed of the fold forming mechanism and the speed of the gathering belts.

While the best mode for carrying out the invention has been described in detail, those familiar with the art to which this invention relates will recognize various alternative designs and embodiments for practicing the invention as defined by the following claims.

What is claimed is:

1. A corrugation machine for making a core of a heat exchanger from a continuous strip of preformed plates connected by deformable links, said machine comprising:
   a base;
   a fold forming mechanism attached to said base, said fold forming mechanism receiving said strip of preformed plates and folding the deformable links to form a flow of plates having partially folded deformable links;
   a gathering mechanism attached to said base downstream of said fold forming mechanism for additionally folding said partially folded deformable links to form a flow of serially connected pairs of mating plates; and
   a stuffing mechanism attached to said base along a path of said gathering mechanism for inserting precut lengths of corrugated webbing between said pairs of mating plates.

2. The corrugation machine of claim 1 further comprising a feed mechanism attached to said base for feeding the continuous strip of preformed plates to said fold forming mechanism at a speed synchronized with said fold forming mechanism.

3. The corrugation machine of claim 1 wherein said fold forming mechanism comprises:
   a pair of opposing tractor drives disposed along opposite edges of said strip of preformed plates, the speed of said opposing tractor drives being synchronized with said predetermined speed; and
   lugs attached to each of said opposing tractor drives to engage opposite sides of said preformed plates to angularly displace adjacent plates of said strip of preformed plates relative to each other thereby partially folding the deformable links.

4. The corrugation machine of claim 3 wherein each opposing tractor drive of said pair of opposing tractor drives comprises:
   an upper drive supported between a first drive wheel and a longitudinally separated first idler wheel, said upper drive having a linear portion between said first drive wheel and said first idler wheel, adjacent to said strip of preformed plates;
   a lower drive supported between a second drive wheel and a second idler wheel, said lower drive having a linear portion between said second drive wheel and said second idler wheel adjacent to said strip of preformed plates;
   and wherein said lugs comprise:
   a first set of spaced lugs attached to said upper drive; and
   a second set of equally spaced lugs attached to said lower drive, said second set of lugs interleaving said first set of lugs along said linear portions adjacent to said strip of preformed plates, said interleaved lugs displacing relative to each other adjacent plates of said strip of preformed plates as they pass through said fold forming mechanism to initiate said folding of said deformable links.

5. The corrugation machine of claim 4 wherein said first and second sets of lugs are triangularly shaped lugs.

6. The corrugation machine of claim 4 wherein said upper and lower drives are upper and lower chain belts.

7. The corrugation machine of claim 6 wherein said first and second sets of shaped lugs have apexes, said apexes of said first and second sets of lugs being configured to permit registration with the strip of preformed plates.

8. The corrugation machine of claim 7 wherein said apexes of said second set of lugs are profiled to accommodate the transition between said fold forming mechanism and said gathering mechanism.

9. The corrugation machine of claim 1 wherein said gathering mechanism comprises:

- a belt disposed along opposite edges of the serially connected pairs of mating plates downstream of said fold forming mechanism, said belt having a preselected linear speed relative to said feed speed and being synchronized therewith;
- a set of lower spacers attached to each belt of said pair of belts, said lower spacers being received between adjacent pairs of mating plates as they exit said fold forming machine to control the degree of folding of the deformable links between adjacent pairs of mating plates; and
- a set of upper spacers attached to each belt of said pair of belts, said upper spacers being received between adjacent pairs of mating plates and displacing the preformed plates of each said pairs of mating plates against each other and controlling the folding of the deformable link connecting the pairs of mating plates to each other.

10. The corrugation machine of claim 9 wherein said set of upper spacers have a diameter selected to dispose adjacent sets of mating plates at a preselected pitch relative to each other.

11. The corrugation machine of claim 10 wherein each of said pair of belts comprises an upper belt and a lower belt and wherein said set of upper spacers are attached to said upper belt and said set of lower spacers are attached to said lower belt.

12. The corrugation machine of claim 9 wherein each belt of said pair of belts has a linear portion adjacent to the edge of said pairs of mating plates gathered by said gathering mechanism extending from said fold forming mechanism.

13. The corrugation machine of claim 2 wherein said stuffing mechanism comprises:

- a stuffing box disposed above said flow of serially connected pairs of mating plates downstream of said gathering mechanism, said stuffing box having a plurality of transverse cavities for receiving said precut lengths of corrugated webbing, said transverse cavities being aligned with spaces between said pairs of mating plates;
- a trap door operable between an open and closed position attached to the stuffing box between said transverse cavities and said pairs of mating plates, said trap door being in its open position to permit displacement of said precut length of corrugated webbing from said transverse cavities into the space between said adjacent pairs of mating plates; and
- a plurality of stuffing blades, one associated with a selected one of said transverse cavities, said stuffing blades being operable to displace said precut lengths of corrugated webbing from said transverse cavities into said spaces between said pairs of mating plates.

14. The corrugation machine of claim 13 further including means for stopping said feed mechanism, said fold forming mechanism and said gathering mechanism for a time sufficient to open said trap door and actuating said plurality of stuffing blades to displace the precut lengths of corrugated webbing into the spaces between said pairs of mating plates.

15. The corrugation machine of claim 1 further comprising a cut-off mechanism attached to said base downstream of said stuffing mechanism for severing said deformable links connecting a selected pair of mating plates to separate a core element for a heat exchanger having a predetermined number of plates.

16. The corrugation machine of claim 15 wherein said cut-off mechanism comprises:

- a bridge suspended over said connected pairs of mating plates;
- a pair of cutters suspended from said bridge in vertical alingnment with said deformable links; and
- means for lowering the bridge to a location permitting said pair of cutters to sever the links connecting the individual plates of a pair of mating plates thereby separating a preselected number of parallel plates required for the core element of said heat exchanger.

17. The corrugation machine of claim 15 wherein said continuous flow of serially connected pairs of mating parts is stopped to insert said precut lengths of corrugated webbing into the spaces between adjacent pairs of mating parts, said cut-off mechanism being responsive to the stopping of said continuous flow of serially connected pairs of mating parts to actuate said bridge to lower and said cutters to cut off said links.

18. The corrugation machine of claim 15 further including a debris removal mechanism for removing the portions of the deformable links severed by said cut-off mechanism from the vicinity of said cut-off mechanism.

19. The corrugation machine of claim 14 further including an accumulator station for accumulating said strip of preformed plates in the region between a source of preformed plates and said feed mechanism to accommodate the periodic stopping of said strip of preformed plates to insert said precut lengths of corrugated webbing into the spacings between said pairs of mating plates.

20. The corrugation machine of claim 19 wherein said accumulator station further includes a slack sensing device to control the speed of said feed mechanism to maintain a number of preformed plates in the accumulator station between predetermined limits.

* * * * *